United States Patent [19]

Story et al.

[11] Patent Number: 4,588,096
[45] Date of Patent: May 13, 1986

[54] KNOCK-DOWN TRAY RACK

[75] Inventors: Ray A. Story, Nashville; Granville P. Elrod, Murfreesboro, both of Tenn.

[73] Assignee: Standex International Corporation, Salem, N.H.

[21] Appl. No.: 773,873

[22] Filed: Sep. 9, 1985

[51] Int. Cl.4 .............................................. A47F 7/00
[52] U.S. Cl. .................................. 211/126; 211/189; 280/79.3
[58] Field of Search .......................... 211/189, 126, 71; 280/47.35, 79.3; 248/188.8, 188.9

[56] References Cited

U.S. PATENT DOCUMENTS

| | | | |
|---|---|---|---|
| 2,959,298 | 11/1960 | Pope | 211/126 |
| 4,004,819 | 1/1977 | Brongo | 280/79.3 |
| 4,045,043 | 8/1977 | Fourrey | 280/79.3 |
| 4,349,213 | 9/1982 | Hirsch | 280/79.3 X |

Primary Examiner—Robert W. Gibson, Jr.
Attorney, Agent, or Firm—Harrington A. Lackey

[57] ABSTRACT

A knock-down tray rack having a horizontal base member, a pair of bow-shaped support members, and a pair of unitary side panels incorporating upright sleeve members at opposite side edges thereof for receiving the upright leg members of the support members, and being provided with opposed vertically spaced ledges for supporting trays thereon. The leg members of the support members are adapted to be easily telescopingly fitted in the corresponding sleeve members of the side panels so that the bow-shaped support members span the side panels and so that the bottoms of the leg members are securely received within corresponding socket members in the base member. The base member may be further supported by casters having mounting extensions extending into the open bottom ends of the depending leg members of the bow-shaped support members.

9 Claims, 6 Drawing Figures

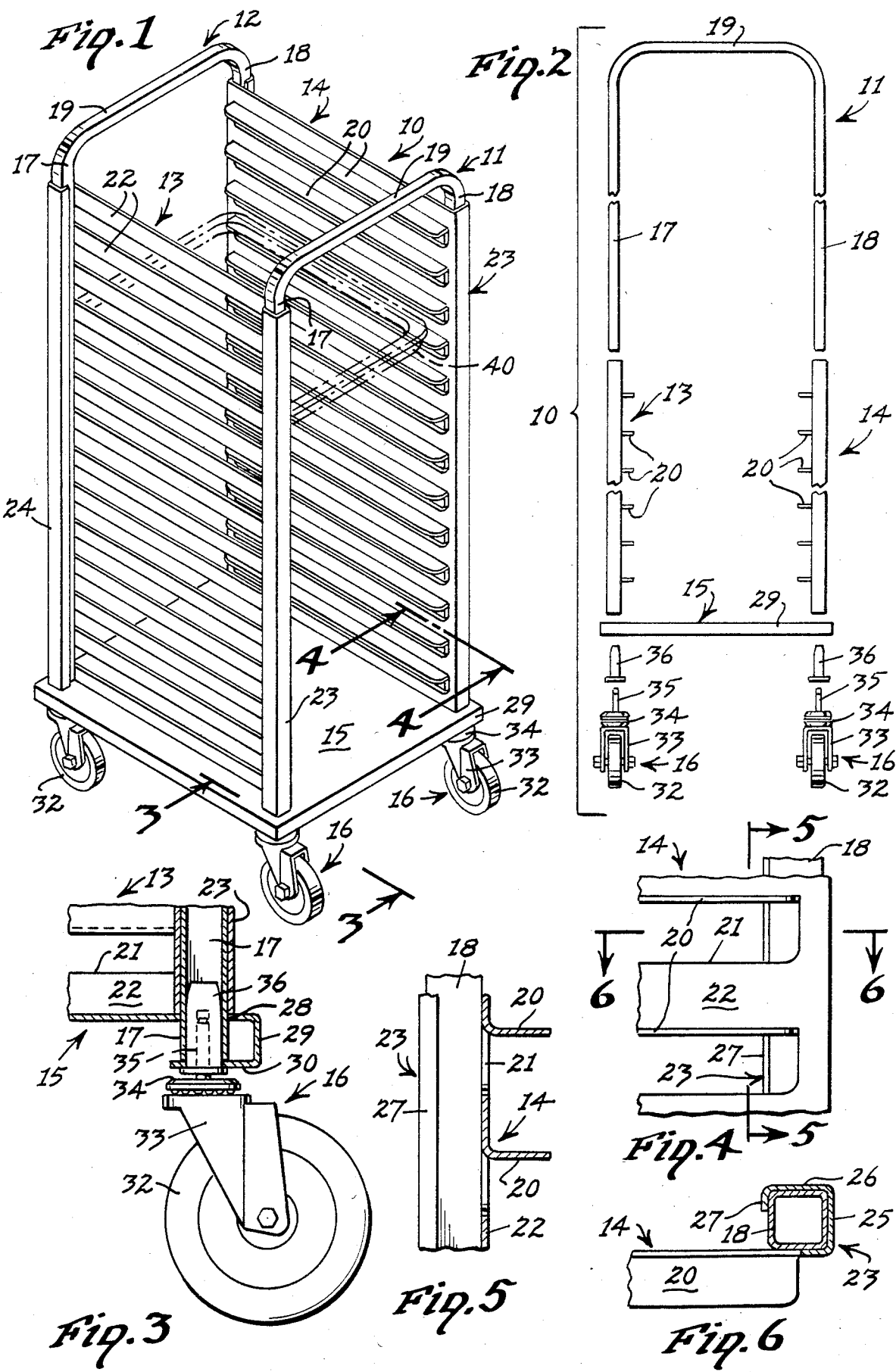

KNOCK-DOWN TRAY RACK

BACKGROUND OF THE INVENTION

This invention relates to a tray rack, and more particularly to a knock-down tray rack.

Tray racks of various types are known in the art, and are used in various institutional and commercial establishments, such as hospitals, hotels, restaurants, bakeries and other institutions for supporting a plurality of vertically spaced trays of food products for storage or transport from one location to another.

One type of conventional tray rack includes a box-like frame, caster wheels fixed to the four bottom corners of the frame, and a plurality of vertically spaced horizontally disposed rails, formed of angle iron, fixed to opposite sides of the frame, and adapted to receive lip-like peripheral flanges on the trays for support and containment of the trays within the confines of the frame.

Another example of a tray rack is disclosed in the prior U.S. Pat. No. 2,959,298, issued to Edker Pope on Nov. 8, 1960. The Pope patent discloses a tray rack in which the side panels have been formed from sheet metal and in which the ledges or rails have been struck out of the sheet metal inwardly to form vertically spaced opposed rails for receiving the trays. The side edges of the sheet metal panels are turned outwardly in the Pope tray rack to form stiffening flanges or supports, the upper ends of which are secured to transverse bars or spreader elements. Although the elements of the Pope tray rack may be assembled and disassembled, nevertheless, they are secured together by numerous bolt connectors. Moreover, the casters are secured by mounting frames which are also bolted to the lower portions of the side flanges.

SUMMARY OF THE INVENTION

The tray rack made in accordance with this invention includes a minimum number of parts which may be easily assembled and disassembled with unskilled labor and without the use of screws, bolts or other fasteners and without the use of tools.

Moreover, the knock-down tray rack made in accordance with this invention is structurally as strong as, and possible stronger than, other conventional types of tray racks which are put together by screws, bolts or rivets. Because of the lesser number of elements and parts incorporated in the tray rack made in accordance with this invention, the rack is relatively light-weight, compared with prior conventional tray racks.

When fully assembled, the tray rack made in accordance with this invention does not utilize any cross bars or reinforcing structure within the space normally occupied by the trays.

The knock-down tray rack made in accordance with this invention includes a pair of bow-shaped support members or bow members having elongated straight legs, a pair of side panels incorporating vertically spaced tray ledges and opposite pairs of upright sleeve members for receiving the legs of the bow members. The legs of the bow members are inserted through the corresponding sleeves of the side panels so that the bow members straddle the side panels and the legs are long enough to extend entirely through the sleeve members into corresponding sockets in a base member or platform. Furthermore, swivel casters having upright stems and extension adapters are inserted into the bottom open ends of the legs in the base member to secure the entire assembled structure for supporting and transporting trays.

In a preferred form of the invention, each of the side panels is made of a sheet material or metal in which the tray ledges are struck out and the sleeve members are unitarily or integrally formed by appropriately bending and turning the upright side edges of the panels into a tubular shape for receiving the legs of the bow members.

Because of the absence of conventional fasteners and tools, the tray rack may be rapidly assembled and disassembled. Furthermore, when the elements are disassembled, they lie substantially flat to occupy a minimum of space for packaging, storage and shipment.

BRIEF DESCRIPTION OF THE DRAWINGS

FIG. 1 is a top front perspective view of the knock-down tray rack made in accordance with this invention and in its assembled position;

FIG. 2 is an exploded front elevational view of the tray rack, with portions broken away;

FIG. 3 is an enlarged fragmentary section taken along the line 3—3 of FIG. 1;

FIG. 4 is an enlarged fragmentary section taken along the line 4—4 of FIG. 1;

FIG. 5 is a fragmentary sectional elevation taken along the line 5—5 of FIG. 4; and FIG. 6 is a fragmentary sectional plan view taken along the line 6—6 of FIG. 4.

DESCRIPTION OF THE PREFERRED EMBODIMENTS

Referring now to the drawings in more detail, FIGS. 1 and 2 disclose a knock-down tray rack 10 made in accordance with this invention. The tray rack 10 includes a front U-shaped or bow-shaped, support member or bow member 11, a rear U-shaped or bow-shaped support member or bow member 12, a pair of opposite side panels 13 and 14, a rectangular or square planar base member or platform 15, and four caster members 16.

The bow members 11 and 12 are identical in construction and include a pair of elongated straight upright leg members or legs 17 and 18, the upper end portions of which are integrally connected by a bight or bridge member 19. Preferably, each of the bow members 11 and 12 is made of a single elongated piece of tubular stock, either stainless steel or aluminum alloy, which is bent to form the U-shaped or bow-shaped member 11 or 12, constituting the two upright legs 17 and 18 and the bridge member 19.

The side panels 13 and 14 are also preferably of identical construction and each is made of a piece of unitary sheet material, preferably sheet metal, which is pierced or punched and bent to the desired shape.

Each of the side panels 13 and 14 is basically co-planar and has an upper edge portion, a lower edge portion and two opposite side edge portions when it is in its operative assembled position as disclosed in FIGS. 1 and 2. The main body portion 22 of each of the panels 13 and 14 is provided with a plurality of uniformly vertically spaced tray ledges or rails 20, which are struck out from the main body portion 22 of the unitary sheet material. Each of the ledges 20 is struck out from the pierced or punched elongated openings 21 formed in the main planar body portion 22 of each of the panels 13 and 14.

Both opposite side edge portions of each of the panels 13 and 14 are turned outwardly and back in several bends to form sleeve members 23 and 24. Each of the sleeve members 23 and 24 is adapted to snugly, but slideably, fit around the corresponding straight legs 17 and 18, as illustrated in FIGS. 1 and 6. Thus, each of the sleeve members 23 and 24 may have three bends, as illustrated best in FIG. 6, to form sleeve walls 25, 26 and 27, snugly wrapped around the leg 18 (FIG. 6), which is illustrated as being square tubular stock.

The square tubular sleeve members 23 and 24 are illustrated in the drawings as being continuous the full height of each of the panels 13 and 14, although they could be formed from a plurality of vertically spaced sleeve sections, not shown, if desired. But in any event, the sleeve members 23 and 24 preferably have the same cross-sectional shape as the cross-section of each of the legs 17 and 18. Each of the legs 17 and 18 is adapted to be slideably inserted or withdrawn from the full length or height of the corresponding sleeve member 23 or 24.

Each of the legs 17 and 18 is slightly longer than the corresponding sleeve member 23 or 24 receiving such leg. When a leg, such as the leg 17 in FIG. 3, is fully inserted into its corresponding sleeve member 23, the lower end portion of the leg 17 projects below the bottom edge of the sleeve member 23 and is adapted to be inserted through a corresponding socket member, such as the socket hole 28 in each corner of the base member 15. The socket hole 28 is just large enough to slideably receive the lower portion of the leg 17, but not to receive the bottom of the sleeve member 23, which rests upon the top planar surface of the base member 18, as best disclosed in FIGS. 1 and 3.

As disclosed in the drawings, the base member 15 is preferably made of sheet material, such as sheet metal, which is cut at its corners and bent back to form the side edge flanges 29 and the turned-in bottom flanges 30. As disclosed in FIG. 3, the bottom end of the leg 17 rests upon the top surface of the bottom flange 30.

Each of the caster members 16 includes a caster wheel 32 freely rotatably supported in a caster mounting bracket 33, which is rotably secured by means such as the ball bearing connector 34. The connector 34 includes a vertical spindle 35 force-fitted into a vertical driven sleeve adapter 36 which, in turn, is force-fitted into the hollow open bottom end of each corresponding leg 17 and 18. Accordingly, the base member or platform 15 will be supported at each corner by a freely, horizontally rotatable caster member 16 including caster wheels 32 which will permit free rollable movement of the tray rack 10 in any horizontal direction.

Moreover, the adapters 36, when force-fitted into the open bottom end of each of the legs 17 and 18, provide additional support and securing means for holding the bow members 11 and 12 and the side panels 13 and 14 rigidly upon the base member 15.

After the trays, such as the tray 40 disclosed in phantom in FIG. 1, have been horizontally slid into a supported position upon the respective opposed ledges 20, then the tray rack 10 may be rolled to any desired location or position for storage or food service.

When the tray rack 10 is no longer in use, and it is desired to store the rack 10 in a minimum of space, the caster members 17 may be removed from the bottom ends of the legs 17 and 18, and each bow member 11 and 12 may be raised to slideably remove the respective legs 17 and 18 from their corresponding sleeve members 23 and 24 to completely disassemble the rack 10. Moreover, each of the bow members 11 and 12, the side panels 13 and 14 and the base member 15 may be stacked or laid down to occupy a minimum of space. Moreover, the four caster members 16 are also relatively flat and small enough to occupy a minimum of space.

Furthermore, because of the knock-down feature each tray rack 10 may occupy a minimum of space in shipment between the manufacturer and the dealers or ultimate consumers.

Moreover, since the two bow members 11 and 12 may be integrally formed of tubular stock of light-weight metal, and the side panels 13 and 14, as well as the base member 15, may be shaped and formed from flat sheet metal, the assembled knock-down tray rack 10 will be relatively light-weight, structurally strong, and with no obstructions in the space occupied by the trays 40.

It will be understood that other types of caster members 16 may be used with different types of adapters, such as expanding sleeve adapters. Furthermore, the knock-down tray rack 10 may be assembled as a stationary structure with no caster members at all, if desired.

What is claimed is:

1. A tray rack comprising:
   (a) a base member having at least one pair of socket members therein,
   (b) first and second side panels, each side panel having at least one elongated upright sleeve member,
   (c) at least one bow-shaped support member including a pair of elongated parallel upright members having upper end portions, a transverse bridge member integrally connecting said upper end portions, and free lower end portions,
   (d) each of said upright members being adapted to be telescopingly received in a corresponding sleeve member so that said bridge member is above said side panels in an upright assembled position,
   (e) said upright members being longer than said corresponding sleeve members,
   (f) said free lower end portions being securely received in said corresponding socket members to rigidly support said support member and said side panels on said base member, in said assembled position, and
   (g) support means on said side panels for supporting vertically spaced trays above said base member and between said side panels.

2. The invention according to claim 1 in which said bow-shaped support member is an inverted U-shaped tubular support member and said pair of upright members are straight.

3. The invention according to claim 1 in which each of said side panels is substantially planar having top and bottom edge portions and opposed side edge portions, each of said side panels having an elongated upright sleeve member adjacent each of said side edge portions, and further comprising two of said bow-shaped support members, and two pair of socket members in said base member, the leg members of one of said bow-shaped members being adapted to be received in the corresponding sleeve members adjacent the same side edge portions of both said side panels, and the upright leg members of the other bow-shaped support member being received in the corresponding sleeve members adjacent the opposite side edge portions of both said side panels, whereby said support members span both said side panels, the spacing of said socket members being such that each socket member receives a corresponding lower end portion of a leg member.

4. The invention according to claim 3 in which said base member has a front end portion and a rear end portion, a pair of transversely spaced front socket members in the front end portion of said base member and a pair of transversely spaced rear socket members in the rear end portion of said base member, one of said bow-shaped support members constituting a front support member and the other of said support members constituting a rear support member, the leg members of said front support member being received in said front socket members and the leg members of said rear support member being received in the rear socket members, in said assembled position.

5. The invention according to claim 4 in which each of said side panels is formed of planar sheet material, the side edge portions of each of said panels being turned to form corresponding upright sleeve members for receiving the upright leg members of said bow-shaped support members, said support means for supporting vertically spaced trays comprising vertically spaced horizontal ledges struck out inwardly from the sheet material of each of said corresponding side panels, the vertical spacing of the ledges of said first panel being equal to the vertical spacing of the ledges of said second panel.

6. The invention according to claim 5 in which each of said sleeve members formed along a side edge portion of a side panel is formed by turning the side edge portions of said sheet material to form an upright sleeve wall substantially surrounding and snugly and slideably engaging the corresponding leg member of a bow-shaped support member in assembled position, to prevent any horizontal movement of said support members relative to said side panels.

7. The invention according to claim 5 in which the free lower end portions of said corresponding leg members are hollow and open at the bottom thereof, each of said socket members comprising a vertical opening through said base member, a caster for each leg member, each caster comprising caster mounting means having an extension for insertion into the open bottom end of each of said leg members, and means permitting swivel motion of each caster about the vertical axis of said leg member.

8. The invention according to claim 7 in which each of said extensions on said casters is adapted to force-fit within the bottom opening in each of said leg members.

9. The invention according to claim 6 in which each of said side panels including said ledges and said sleeve members are formed from unitary sheet material.

* * * * *